United States Patent [19]

Hallamasek

[11] Patent Number: 5,457,581
[45] Date of Patent: Oct. 10, 1995

[54] TIMING RECOVERY ON LONGITUDINAL MAGNETIC TAPE RECORD CHANNELS BASED ON CAPSTAN VELOCITY FEED FORWARD

[75] Inventor: Kurt F. Hallamasek, Berkeley, Calif.

[73] Assignee: Ampex Corporation, Redwood City, Calif.

[21] Appl. No.: 866,932

[22] Filed: Apr. 10, 1992

[51] Int. Cl.⁶ .................................................. G11B 5/09
[52] U.S. Cl. ........................ 360/51; 360/73.09; 360/10.3
[58] Field of Search ............................. 360/27, 10.1, 10.3, 360/51, 55, 72.2, 72.3, 73.04, 73.08

[56] References Cited

U.S. PATENT DOCUMENTS

| | | | |
|---|---|---|---|
| 3,532,974 | 10/1970 | Lemoine | 324/188 |
| 3,836,774 | 9/1974 | Guzman et al. | |
| 4,079,300 | 3/1978 | Sleger | 318/326 |
| 4,095,732 | 6/1978 | Merritt | 226/33 |
| 4,232,257 | 11/1980 | Harshberger, Jr. | 318/314 |
| 4,363,048 | 12/1982 | Tanaka et al. | 360/137 |
| 4,607,294 | 8/1986 | Nishitani et al. | 360/35.1 |
| 4,649,439 | 3/1987 | Tanaka | 360/10.3 |
| 4,862,297 | 8/1989 | Fukami et al. | 360/32 X |
| 4,868,689 | 9/1989 | Egami et al. | 360/51 X |
| 4,899,233 | 2/1990 | Yoshida | 360/77.14 |

*Primary Examiner*—Andrew L. Sniezek
*Attorney, Agent, or Firm*—John Mesaros; George Almeida; Jim Thomson

[57] ABSTRACT

A timing recovery system for the low density longitudinal record channels utilizing capstan velocity or feed forward rate in a magnetic tape recording/reproducing system in which the capstan feed forward velocity, derived from an encoder, provides a signal whose frequency is proportional to the speed of the tape driven by the capstan. A scaling circuit is provided by a frequency-to-voltage converter followed by a voltage-to-frequency converter, the output signal providing a demodulation clock having a multiplied frequency proportional to the data rate reproduced from the tape. The demodulation clock, fed to the timing window generation circuitry, provides an input to data detection circuitry to provide a clocked data output, regardless of the reproduce speed within a very large range of speeds.

13 Claims, 3 Drawing Sheets

TIMING RECOVERY ON LONGITUDINAL MAGNETIC TAPE RECORD CHANNELS BASED ON CAPSTAN VELOCITY FEED FORWARD

FIELD OF THE INVENTION

This invention relates to timing recovery on longitudinal magnetic tape record channels, and more particularly to the recovery of timing information without the use of phase-locked loops.

BACKGROUND OF THE INVENTION

Typically, in magnetic tape recording and reproducing apparatus, tape extends along a low inertia tape path from a supply reel or hub past recording/reproducing transducers and a capstan to a take-up reel or hub. The capstan engages the tape to provide bi-directional control of tape motion past the transducers. In magnetic tape recording, be it longitudinal or helical track recording, longitudinal tracks are utilized for providing some indication of timing as well as the location of the data recorded thereon. Traditionally, for playback, a clock is derived from the data coming from the tape with the use of a phase-locked loop circuit. The phase-locked loop attempts to track fluctuations in the data rate resulting from variations in tape speed. Ideally, a clock which is synchronous with the data is derived from the data itself. Phase detectors and phase-locked loops are required in this process.

Phase-locked loop circuits are non-linear feedback systems and require the use of loop filters. Phase-locked loop systems suffice in tape recording systems where clock phase is important and, more importantly, where the data rate, on both record and playback is nominally constant. However, where playback velocity in particular, varies over a very wide range, this makes it difficult to construct a phase-locked loop locking on to data being read from the tape over such a large range of data rates. Particularly at slow speeds, or where the tape is changing direction, control track information may not be reliably detected with an inductive head on a slow-moving tape since playback voltage is proportional to tape speed.

In present day recording systems, such as those which employ helical recording, for example, data is recorded on diagonal tracks or channels, physically positioned between two of three longitudinally recorded tracks or channels. By way of example, for digital video formats such as the D-2 format, and for digital data storage format known as DD-2, the data recorded in the longitudinal channels contains logical and physical information about the data recorded on the tape and needs to be recovered reliably at playback speeds ranging from 0.1 times normal to about 60 times normal. Fast search and retrieval operations are required, and the timing information relating thereto must be derived from the associated track, regardless of tape direction and/or speed. Phase-locked loop circuits operating over such a range, and deriving timing information from such tracks, are either unduly complicated, and hence expensive, or unreliable over the range.

For magnetic tape recorded on helical scan apparatus, the user data tracks (diagonal tracks) are generally recorded at high density, while the longitudinal tracks are generally recorded at low density. Longitudinal tracks are recorded with a fixed relationship to the user data tracks (as prescribed by the tape format). The information in the longitudinal tracks may contain either physical position information relating to the physical location at which user data is recorded on the tape, or logical position information relating to the physical location of logical structures in the user data on the tape. During search operations, user data can not be reliably decoded, so data from the longitudinal tracks is used to locate user data. The tape movement is thus typically controlled by relying on data from the longitudinal tracks.

Information on the longitudinal tracks is often encoded with self-clocking channel codes, which have at least one transition per bit cell. It is then possible to decode timing information derived from the data while detecting the data without a clock which is phase-locked to the data. One such method relies on measuring the time period between successive transitions in the data stream. Data is then detected from the sequence of measurements. For example, in Manchester codes, transitions in data bits are either one half bit cell or one bit cell apart. In the ANSI-standard sync marks used with these codes, two pairs of transitions are separated by three half bit cells. Thus, the ratio of longest time between transitions to shortest time between transitions is nominally restricted to a fixed ratio between transitions in the data stream. This constraint on allowable periods is used for synchronization and for establishing timing windows for the detection process. Based on measurements of bit cell widths in the past, thresholds are set up for time intervals. As new measurements are made, they are compared against these thresholds for the purpose of data detection. For example, based on the established timing windows, it is decided if the period between two transitions was one-half, one, or one and one-half bit cells long. As the tape slows down to come to a halt, bit cells are played back further and further apart in time, and the time intervals between bit cells may change significantly between transitions. If the demodulation clock used to measure the intervals does not change with tape speed, the measurement will result in erroneous detection.

In the prior art, there are instances of the use, in a video tape recorder, of a device coupled for rotation with, or in proportion to, the capstan to provide a signal related to movement of the capstan. One such apparatus is shown and described in U.S. Pat. No. 4,363,048, entitled "Time Counting Clock Generator", which issued to Tanaka et al. on Dec. 7, 1982. In the Tanaka et al. patent, there is disclosed a magnetic wheel coupled to the shaft of an idler roller or counter roller in physical contact with the magnetic tape. A pair of magnetic pick-up heads are provided in facing relation with the wheel, circumferentially displaced so that their output pulse signals are 90 degrees out of phase with respect to each other, that is, in quadrature. This patent describes a system to measure tape position, in which the measurement is used for position control of the tape and to compute the length of tape left on the reel. This quadrature position encoder is used to determine the direction of the tape travel and to provide a two-phase clock with a nominal frequency proportional to tape velocity. A circuit is used to synchronize the phase of the two-phase clock with pulses played back from a control track each time a pulse is encountered. The objective of the system is to measure tape length accurately, even when tape speed is slow or tape speed changes direction. It does, however, not generate a clock signal which can be used to detect data coming from the tape.

In accordance with one aspect of the present invention there is provided a timing recovery method and apparatus which derives and recovers the timing information without the use of phase-locked loops, or as a supplement to a phase-lock loop, and without relying on data rate information from the data itself.

In accordance with another aspect of the invention, timing is derived from tape velocity information available from the capstan servo, which tape velocity information is used to adjust the modulation clock frequency to aid in the detection of data.

SUMMARY OF THE INVENTION

The foregoing and other objects of the invention are accomplished by providing timing recovery for the longitudinal record channels based on capstan velocity or feed rate in a magnetic tape recording/reproducing system in which the capstan velocity, derived from an encoder, provides a signal whose frequency is proportional to the speed of the tape driven by the capstan. A scaling circuit is provided by means of a frequency-to-voltage converter followed by a voltage-to-frequency converter, the output signal providing a demodulation clock having a scaled, or multiplied frequency proportional to the data rate reproduced from the tape. The demodulation clock, fed to the timing window generation circuitry, provides an input to the data detection circuitry to provide a clocked data output, regardless of the reproduce speed within a very large range of speeds.

Other objects, features and advantages of the invention will become apparent from a reading of the specification, when taken in conjunction with the drawings in which like reference numerals refer to like elements in the several views.

DESCRIPTION OF THE PREFERRED EMBODIMENT

Figure 1:
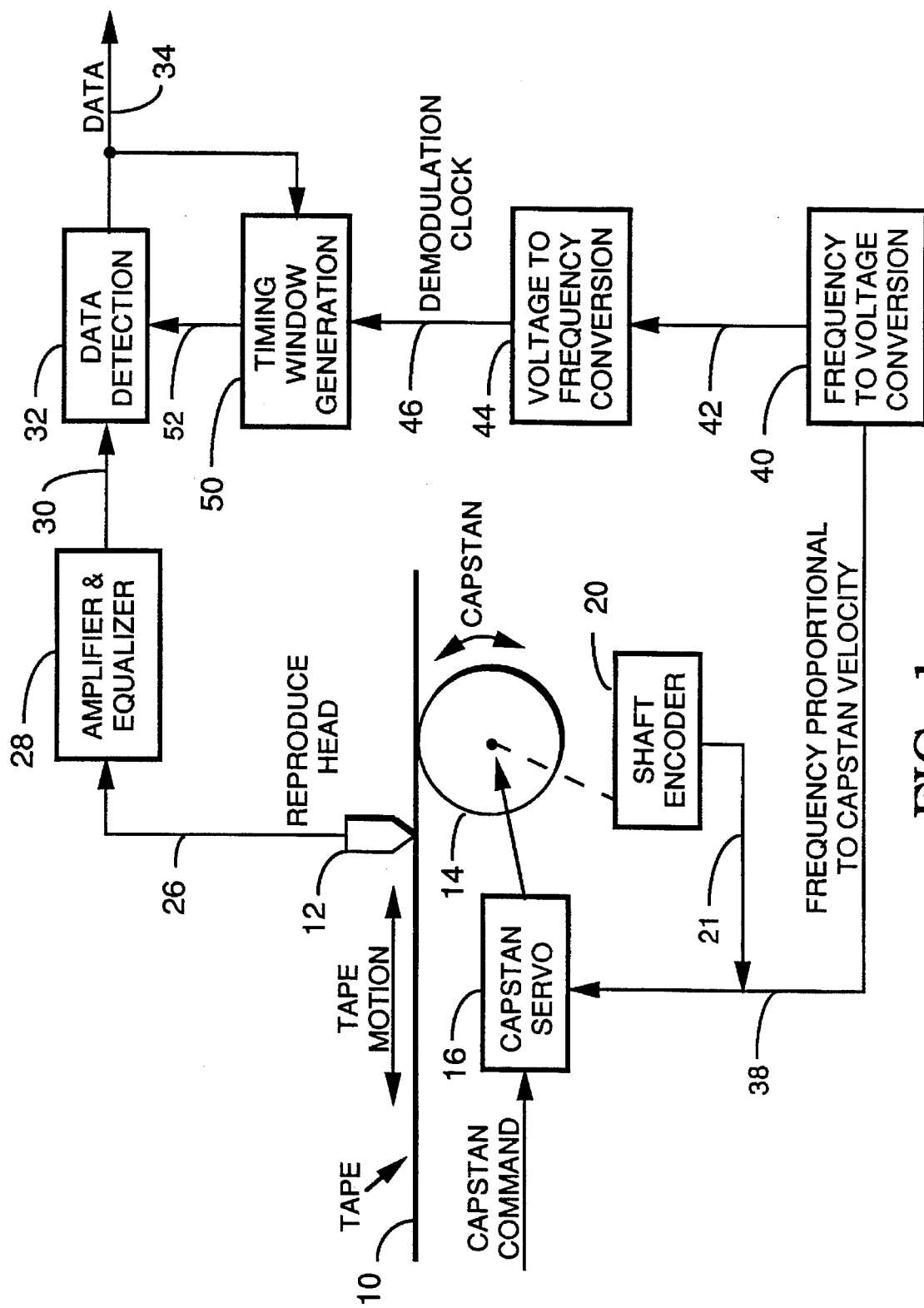
FIG. 1 is a block diagram of the system for timing recovery for longitudinal record channels based on capstan velocity in accordance with the invention.

Referring now to the drawings, there is shown a block diagram of the system according to the invention, wherein a magnetic tape, generally designated 10 is moved, bidirectionally, as indicated by the double ended arrow adjacent thereto, relative to a reproduce head or transducer 12 by means of a capstan 14. The head or transducer 12, in the context of a helical scan recorder is the stationary head which records and reproduces the longitudinal tracks, it being understood that a separate rotary scanner is employed for recording and reproducing the diagonal data tracks. In such helical scan systems, the longitudinal record channels in D2 digital video format include the time code, while in the DD-2 digital data storage format, the longitudinal record channels include control data on one track, physical address data on a second track and logical address data on a third track.

The longitudinal record channels on D2 digital video format (time code), and DD-2 digital data format (control track, physical address track, logical address track) recorders differ in two important aspects from data channels. They are recorded at comparatively low density (18 bits/mm, compared to 2630 bits/mm in the data channels), and they need to be played back over a large range of speeds (0.1 times normal to 60 times normal). The present invention is particularly useful in these cases, since the self-clocking channel code (Manchester code) of the timing code and control track code can be detected without requiring a clock which is phase-locked to the data.

The capstan 14 is controlled by a motor operated capstan servo system 16 which physically drives the capstan 14. The capstan servo system receives capstan movement commands or inputs 18 from other circuitry, such as the central processor and controller (not shown) of the tape recording system, and an input from a shaft encoder 20, via line 21. The shaft encoder 20 is an optical encoder coupled to the capstan 14 to produce a signal proportional to the rotational velocity of the capstan 14, and provides a feedback signal to the servo system to indicate the actual rotational speed versus the desired speed from the capstan command signal 18. Such a shaft encoder 20 is normal to servo systems for controlling the speed of tile motor actuated device, whether or not a phase-locked loop circuit is utilized. As will become apparent, in the instant invention, this encoder 20 serves a second purpose.

The reproduce head or transducer 12 reproduces or reads the data from the longitudinal track of the tape 10, and provides that data, via line 26, to an amplifier and equalizer circuit 28, from which the amplified and equalized data is provided, via line 30, to a data detection circuit 32, the output 34 of which constitutes the processed data from the tape 10.

In accordance with the present invention, the capstan velocity signal on line 21 is also provided, via line 38, to a frequency-to- voltage converter 40. The signal from the encoder 20 is a series of pulses, the frequency of which is proportional to the capstan 20 velocity. The voltage output of converter 40 is provided, via line 42 to a voltage-to-frequency converter 44, with this voltage appearing on line 42 being an analog signal proportional to the speed of capstan 20, and hence, to the speed of motion of the tape. The output of the second converter 44 is a frequency, which is a multiple of the frequency of the velocity of the capstan 14, and, thus a multiple of the data rate of the data being reproduced or read from the tape 10. The characteristics or parameters of the frequency-to-voltage converter 40 and the voltage-to-frequency converter 44 are selected to provide the desired multiplication factor of frequency. This scale selection, in part, would be dictated by the slowest speed at which the tape is to be operated, the recording density of the longitudinal track of interest to be utilized for timing or control purposes, and other factors.

Operationally, the rate at which data is being read or reproduced from the tape 10 is directly related to the tape 10 velocity. The position and velocity of the tape 10 itself are controlled by the capstan 14. The timing recovery described herein takes advantage of the information about fluctuations in data rate present in the capstan 14 velocity measurement sensed by the shaft encoder 20.

Figures 3, 4:
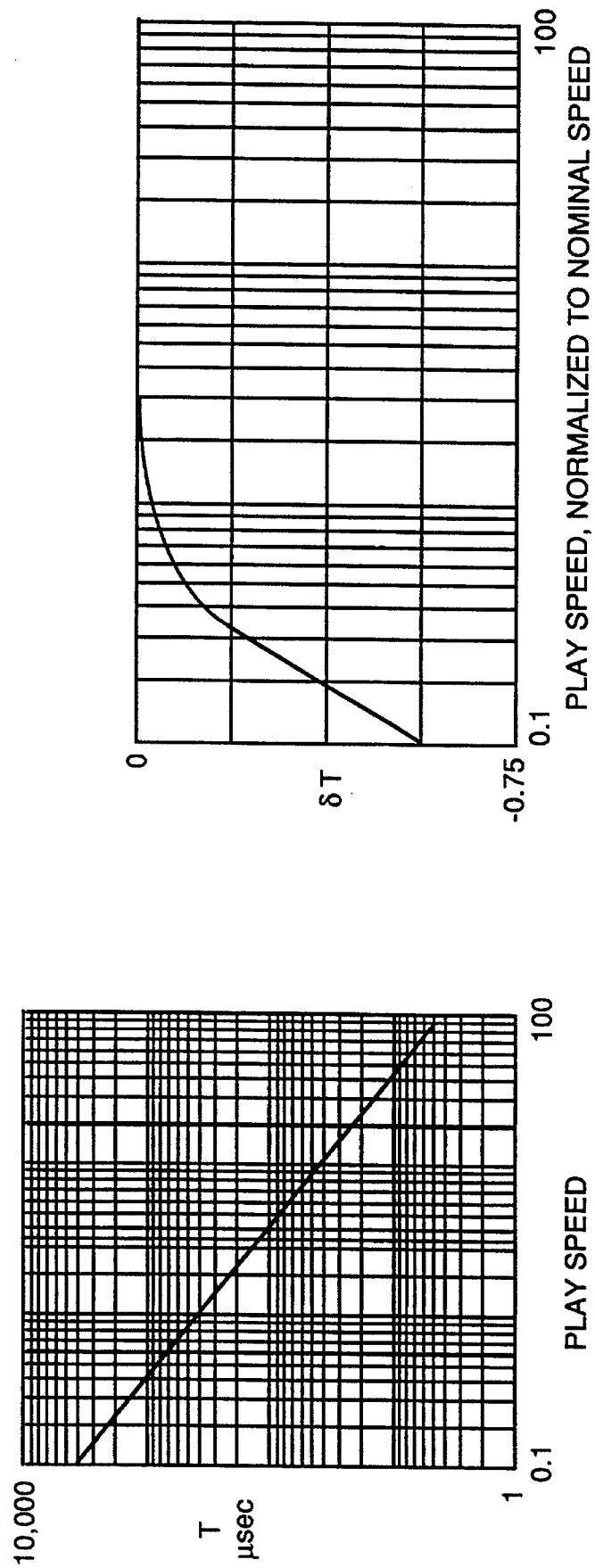
FIG. 3 is a graph of bit cell duration plotted against tape velocity.
FIG. 4 is a graph depicting the rate of change in bit cell period for constant positive acceleration plotted against play speed, normalized.

The output of the voltage-to-frequency converter 44 is provided as a demodulation clock signal over line 46 to a suitable gating means, such as the timing window generation circuit 50, which receives the data from line 34 and controls the data detection circuit 32 to provide clocked data over line 34. The demodulation clock signal thus derived and provided on line 46 is directly proportional to the velocity of the capstan 14. In its linear range of operation, a fixed number of demodulation clock cycles corresponds to one bit cell of data regardless of playback speed. The advantage of this method is particularly evidenced at low data rates, where the dynamics of the tape transport can change the period for one bit cell significantly within one bit interval. In this case, feedback methods will fail to estimate the bit timing cell due to lack of feedback information. This effect is graphically depicted in FIG. 3 which, although the relationship appears linear, it is to be stressed that the curve is drawn on a log-log scale graph. At low tape speed, bit cell durations (vertical axis) are dramatically greater than the bit cell duration at higher play speeds (horizontal axis), the play speed range depicted being from 0.1 to 100 times nominal playback speed. FIG. 4 views the problem from a rate of change viewpoint, and shows change in bit cell period for a constant positive acceleration plotted against play speed for both maximum and minimum acceleration, normalized to the time it takes to travel one bit cell at the designated speed. In effect, FIG. 4, assuming acceleration at a constant rate, demonstrates the amount, percentage wise, that a bit cell will change in the period it takes to travel one bit cell. The details pertaining to these graphs will be amplified on later. Similarly, timing based on fixed clocks measuring the bit cell will also produce erroneous bit cell measurements.

Figure 2:
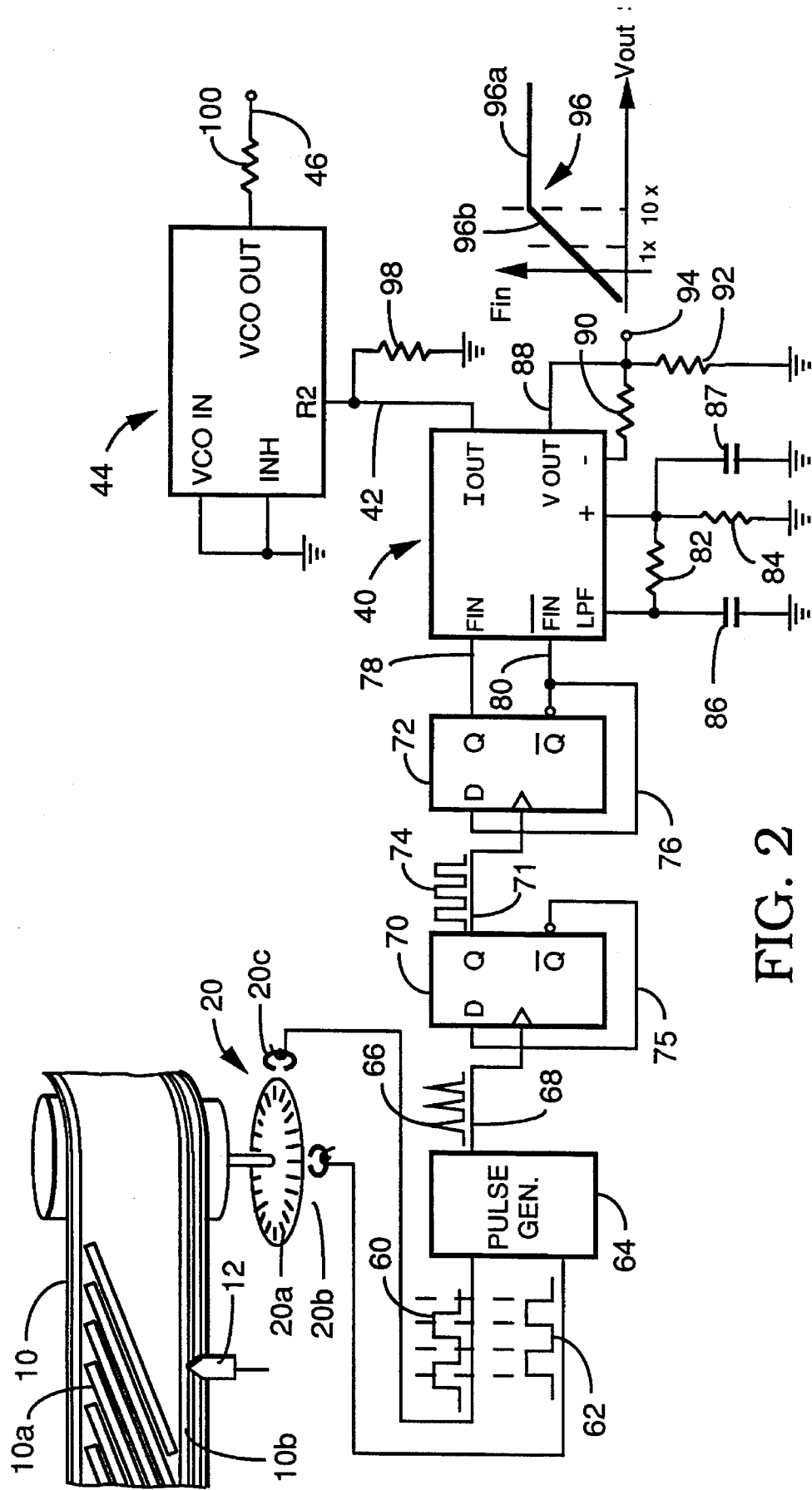
FIG. 2 is a more detailed block diagram of the circuitry of FIG. 1 used to derive the demodulation clock signal.

Referring now to FIG. 2, there is shown a more detailed block diagram of the portion of the circuit of FIG. 1 which derives the demodulation clock signal at line 46, with wave forms on the drawing at appropriate locations. As shown, the tape 10 includes at least one longitudinal track 10b (three such longitudinal tracks being shown) having some form of address data, along with the helical scan tracks 10a (in the area between two of the longitudinal tracks) with user data. The movement of the tape 10 is effected in a conventional manner by the motor (not shown) operated capstan 14 which has coupled to the shaft thereof an optical disk 20a of a shaft encoder 20. First and second optical detectors 20b and 20c, physically arranged 90 degrees apart relative to the disk 20a, provide a bi-phase output, that is, first and second wave forms 60, 62, shown in time-aligned relationship shifted by 90 degrees, one relative to the other. These two wave forms 60, 62 are fed through a pulse generator 64 to produce the pulse train 66 at the output 68. The pulses of the pulse train 66 are equally spaced with each pulse corresponding to either a positive or negative going transition of either input wave form 60, 62, thus providing a pulse train labeled "4X CAP", that is, four times the capstan pulse speed. As a point of reference, the pulses from the shaft encoder 20 are about 1973 pulses per capstan 14 revolution and, taking into consideration the dimensions of the disk 20b, the pulses in the pulse train 66 result in a frequency of about 3 kHz at nominal playback speed, which corresponds to a tape speed of about 132 mm/second.

This output is serially transferred through first and second positive-edge-triggered flip-flops 70 and 72, the outputs of which are represented by the square wave 74 at the output on line 71 of flip-flop 70. The inverted "not-Q" outputs of both flip-flops are coupled to the D-inputs thereof over lines 75 and 76, respectively. The flip-flops 70 and 72 are conventional and of the type sold by Texas Instruments Corporation under the designation SN74HCT74. The square wave output is provided from the Q-output of flip-flop 72 to the frequency in (F IN) input of the frequency-to-voltage converter 40 over lead 78, with the inverted output of the "not-Q" output of the flip-flop 72 being coupled to the "not frequency in" input of converter 40 over lead 80. The frequency-to-voltage converter 40 is of the type sold by National Semiconductor Corporation under the designation LM2917. For ease of illustration and description, not all inputs to the device have been shown, and the same applies to the voltage-to-frequency converter 44 to be described.

The conversion factor of the converter is determined by the R-C time constant of the circuit. This time constant is determined by the value of the resistors 82, 84 and capacitors 86, 87 in the circuit network bridging inputs "LPF" and "+" to the converter 40. The inputs "+" and "−" are the input and inverted input, respectively, to an operational amplifier within the device, the output of which is coupled to the base of an NPN output transistor, the collector path of which is the output I OUT and the emitter path of which is the V OUT output of the converter 40. The V OUT output on lead 88 is at the center tap of a series resistor network consisting of resistors 90 and 92, the other end of resistor 92 being coupled to ground with the other end of transistor 90 providing an input to the inverted input (−) of the opamp within the converter 40. The output on lead 88 is connected to an external terminal 94, at which there is a voltage output proportional, within a certain range, to the frequency of the input to the converter 40.

The output of the converter 40 is graphically depicted by curve 96 adjacent the terminal 94, with frequency (F IN) on the vertical axis and voltage (V OUT) on the horizontal axis. The components are selected to provide a zero voltage output at a predetermined output frequency, while the characteristics of the converter 40 provide a limiting frequency, that is, the when the input frequency equals or exceeds a selected rate, the curve is horizontal as depicted at curve portion 96a. This is accomplished by virtue of a Zener regulator, the inputs of which are the two inputs for the input frequency. The portion 96b of the output curve 96 provides a linear relationship (with an offset) between the input frequency and the output voltage at terminal 94. For comparative purposes, there are two vertical lines on the graph, designated "1X" and "10X", these being those frequencies which generally correspond to nominal tape playback speed and 10 times nominal tape playback speed. The zero voltage crossing point of the curve portion 96b would correspond generally to the lowest tape playback speed expected, that is, 0.1 times the nominal playback speed of the system. The "10X" vertical line intersects the knee of the curve 96, that is, the junction of curve portions 86a and 96b. While this is shown as "10X", the curve transition is selected to be somewhere between 8 times and 16 times nominal playback speed, the purpose being to provide the linear frequency/voltage relationship in the critical speed ranges of interest, that is, when data is transferred or read from tape 10 at low tape speeds, where conventional phase-locked loops have inherent disadvantages. After that point, as will become apparent, the frequency of the demodulation clock on line 46 is constant.

The output of the frequency-to-voltage converter 40 is fed, via line 42 to the R2 input of a voltage-to-frequency converter 44, with a resistor 98 interconnected between this input and ground. The device used is a VCO device (sold by Signetics Corporation under the designation 74HCT4046A, which contains other functions that may be used in phase-locked loops), the inputs being biased and coupled in a way to provide voltage-to-frequency conversion, where the output is linearly proportional to the input voltage. The input is provided from the I OUT output of the converter 40, which is the current output, this being transformed to a voltage signal by virtue of the resistor 98, with the input to R2 on line 42 being the voltage appearing at the connected point of resistor 98. For operation as a voltage-to-frequency converter 44, the VCO IN input is connected to the inhibit (INH) input and both are coupled to ground. The output appearing at the output designated VCO OUT is a frequency proportional to the voltage level at the resistor 98. The output is coupled to a current limiting resistor 100 to provide the thus derived demodulation clock signal at lead 46.

With the circuitry of the present invention, the capstan 14 velocity is measured with an optical servo encoder 20 (which is already in place in the servo system) and scaled up to a frequency which is multiple of that velocity. In the instant embodiment, the scaling is by a factor of 4 or 5, that is, the frequency output of the voltage-to-frequency converter 44 will be 4 to 5 times the frequency of the pulse train 66. In the linear range of operation (curve portion 96b) of the voltage-to-frequency converter 44, a fixed number of demodulation clock cycles corresponds to one bit cell, regardless of playback speed within that range.

FIGS. 3 and 4 depict graphically, on a logarithmic scale, the results of tape velocity and tape acceleration on the bit cell duration. In the present apparatus, information is stored on the longitudinal tracks at a density of approximately 18 bits/mm, corresponding to a bit cell of 0.0055 mm. Let $\lambda$ denote the bit cell length, then the duration of a bit cell, T, as a function of play speed, v, with no acceleration is given by $$T = \lambda/v$$

At nominal play speed, $v_o = 131.7$ mm/sec, and $T_o = 417$ μsec.

FIG. 3 depicts the range of nominal bit cell duration over the required range of operating velocities at which position information on tape has to be read. The horizontal axis has been normalized to nominal play speed. In the instant apparatus, with tape speed operating at 0.1 to 60 times nominal during search and retrieval operations, the bit cell duration changes from about 4167 μsecs. to about 7 μsecs, a factor of over 600 to 1.

The time (T) for the tape to travel one bit cell ($\lambda$) when the tape initially moves at velocity v and is subject to acceleration a is represented as follows:

$$T(v,a) = -\frac{v}{a} + \sqrt{\frac{v^2}{a^2} + \frac{2\lambda}{a}}$$

This relationship can be used to calculate the amount of change in the nominal duration of a bit cell when the tape is subjected to acceleration. If the tape is initially traveling at velocity v, and then is accelerated at a constant acceleration a, the change in bit cell duration, after traveling one bit interval is given by:

$$\delta T(v,a) = \frac{-\frac{v}{a} + \sqrt{\left[\frac{v^2}{a^2}\right] + \left[\frac{2\lambda}{a}\right]} - \frac{\lambda}{v}}{\frac{\lambda}{v}}$$

where the change has been normalized to the bit cell duration at the initial velocity.

Using the above equation, FIG. 4 depicts the normalized change in the bit cell duration for the maximum acceleration of 25 m/sec2. The horizontal axis has also been normalized to nominal play speed.

It is to be emphasized that while the advantage of the present invention is particularly evidenced at low data rates where the dynamics of the tape transport can change the period for one bit cell significantly within one bit interval, tape acceleration is only one component of the factors which impact, and other components include fluctuations in tape speed due to friction, as well as other mechanical and electrical perturbations. By utilizing the capstan 14 as the sensing mechanism for the demodulation clock signal, any variations or fluctuations in the tape speed or acceleration should first appear at the capstan (assuming negligible or zero tape slippage).

In accordance with the present invention, there has been shown and described a method and apparatus to facilitate recovery of information recorded in digital form on a control track or time code track. In the DD-2 tape format, for example, servo marks are recorded using phase encoding and saturated recording. The demodulation clock signal (on line 46) of the present invention is derived from a capstan 14 which is normally in contact with the tape 10 and rotates therefore at a proportional rate. In contrast to the tape length measurement system of the Tanaka et al patent, although Tanaka derives a clock signal from the capstan or idler which is proportional to the tape speed, the requirements on the generated clock signals in either case are quite different: for tape length measurement and position control, it is important that tape position be synchronized with the clock phase, that is, there is a one-to-one relationship between control track pulses and measuring clock cycles. Requirements on the demodulation clock of the present invention are less strict, that is, the demodulation clock runs at a multiple rate of the capstan shaft encoder signals, with an arbitrary phase relationship to the capstan speed for the purpose of aiding in the detection and recovery of data. The purpose of the frequency to voltage converter is to obtain an estimate of tape velocity so that a demodulation clock proportional to the tape velocity can be generated.

While there has been shown and described a preferred embodiment, it is to be understood that various other adaptations and modifications may be made without departing from the spirit and scope of the invention.

I claim:

1. A magnetic tape recording and reproducing apparatus comprising:

means for providing on the magnetic tape a longitudinally recorded channel of encoded data containing timing information;

means for moving said tape;

means for deriving, in response to said moving means, a clock signal having a variable frequency proportional to the tape speeds over a wide range of reproducing speeds of the tape;

means for detecting said data using said clock signal to gate the data to provide a clocked data output over said wide range of reproducing speeds of the tape;

wherein said detecting means includes data detection means receiving the data, and window generation means for supplying timing thresholds to said data detection means in response to said clock signal, said data detection means providing said clocked data output in response to said timing thresholds; and wherein said deriving means includes means responsive to said moving means for producing a first pulse train at a frequency proportional to the wide range of reproducing speeds of the tape, and scaling means for providing said clock signal as a demodulation clock signal at a frequency proportional in multiples of said pulse frequency up to a given frequency, after which said demodulation clock signal is constant.

2. The apparatus of claim 1 wherein said demodulation clock signal is proportional at least in the range of 0.1 to 8.0 times the nominal reproducing speed of the tape.

3. The apparatus of claim 1 wherein said scaling means includes a frequency-to-voltage converter receiving, as an input, said pulse train and providing an voltage output proportional to the frequency of said pulse train.

4. The apparatus of claim 3 wherein said scaling means includes a voltage to frequency converter for receiving, as an input, said voltage output, and for providing, as an output, the demodulation clock signal at a frequency of four to five times the frequency of said pulse train.

5. The apparatus of claim 4 wherein said detecting means includes data reproducing means.

6. In a magnetic tape recording and reproducing system having user data channels recorded at high density and timing data recorded at low density on at least one longitudinal channel for recovery during reproducing over a wide range of speeds, and wherein the timing data is recovered by measuring periods between transitions of such data, the apparatus comprising:

means for generating a clock signal at a variable frequency proportional to the tape speed over said wide range of speeds;

means for detecting the timing data from said at least one longitudinal channel in accordance with said clock signal of said variable frequency to provide a clocked data output over said wide range of reproducing speeds;

said detecting means including window generation means receiving said clock signal of variable frequency and, in response thereto, for gating the detecting means to provide said clucked data output over said wide range of tape speeds;

wherein said detecting means includes data reproducing means;

wherein said means for generating said clock signal includes:

means for generating a pulse train at the variable frequency proportional to the wide range of tape speeds; and means responsive to said generating means for scaling said pulse train variable frequency to a multiple thereof to provide a demodulation clock signal of related variable frequency; and wherein said detecting means further includes:

amplifying and equalizing means for receiving the data from said reproducing means; and data detection means for receiving the output of said amplifying and equalizing means.

7. In a magnetic tape recording and reproducing system having user data channels recorded at high density and timing data recorded at low density on at least one longitudinal channel for recovery during reproducing over a wide range of speeds, and wherein the timing data is recovered by measuring periods between transitions of such data, the apparatus comprising:

means for generating a clock signal at a variable frequency proportional to the tape speed over said wide range of speeds;

means for detecting the timing data from said at least one longitudinal channel in accordance with said clock signal of said variable frequency to provide a clocked data output over said wide range of reproducing speeds;

said detecting means including window generation means receiving said clock signal of variable frequency and, in response thereto, for gating the detecting means to provide said clocked data output over said wide range of tape speeds;

wherein said detecting means includes data detection means receiving said timing data, and window generation means being operative to gate the data detection means in response to said clock signal of variable frequency; and scaling means, including;

means for generating a pulse train at a variable frequency proportional to the tape speed;

a frequency to voltage converter receiving, as an input, said pulse train and providing a voltage output proportional to the frequency of said pulse train; and a voltage to frequency converter for receiving, as an input, said voltage output, and for providing, as an output, said clock signal at a frequency of four to five times the frequency of said pulse train.

8. The apparatus of claim 7 wherein said detecting means includes at least one data reproducing transducer.

9. The apparatus of claim 8 wherein said generating means includes roller means in contact with the tape, and an encoder coupled for rotation in proportion to the rotation of said roller means.

10. The apparatus of claim 7 wherein said scaling means provides a demodulation clock signal at a frequency proportional in multiples of said pulse train frequency up to a given frequency, after which said demodulation clock signal is constant.

11. The apparatus of claim 10 wherein said demodulation clock signal is proportional at least in the range of 0.1 to 8.0 times the nominal reproducing speed of the tape.

12. In a magnetic tape recording and reproducing system having user data channels recorded at high density and timing data recorded at low density on at least one longitudinal. Channel for recovery during reproducing over a wide range of speeds, and wherein the timing data is recovered by measuring periods between transitions of such data, the apparatus comprising:

means for generating a clock signal at a variable frequency proportional to the tape speed over said wide range of speeds;

means for detecting the timing data from said at least one longitudinal channel in accordance with said clock signal of said variable frequency to provide a clocked data output over said wide range of reproducing speeds;

said detecting means including window generation means receiving said clock signal of variable frequency and, in response thereto, for gating the detecting means to provide said clocked data output over said wide range of tape speeds;

wherein said means for generating said clock signal includes:

means for generating a pulse train at the variable frequency proportional to the wide range of tape speeds; and means responsive to said generating means for scaling said pulse train variable frequency to a multiple thereof to provide a demodulation clock signal of related variable frequency;

wherein said scaling means including a frequency to voltage converter receiving, as an input, said pulse train providing a voltage output proportional to the frequency of said pulse train; and wherein said scaling means includes a voltage to frequency converter for receiving, as an input, said voltage output, and for providing, as an output, said demodulation clock signal at a frequency of four to five times the frequency of said pulse train.

13. A method for recovering timing information from a data channel recorded longitudinally on magnetic tape movable during reproduce operations over a wide range of speeds, said method comprising steps of:

moving the tape over said wide range of speeds;

generating, in response to the step of moving, a clock signal whose frequency varies in proportion to the speed of movement of the tape over said wide range of speeds;

gating the data reproduced from said channel by means of said variable frequency clock signal, to provide a clocked data output;

wherein said step of moving the tape includes roller and encoder means, and wherein said generating step includes deriving a pulse train from said roller and encoder means having a frequency which varies in proportion to said wide range of speeds, wherein said clock signal is generated from said pulse train; and wherein said generating step includes, converting the variable frequency pulse train from said encoder means to a voltage proportional to the varied speed of movement of the tape, and converting said voltage back to a frequency quantity in the form of a demodulation clock signal having a variable frequency which is a multiple of said variable pulse train frequency.

* * * * *